Figure 1:
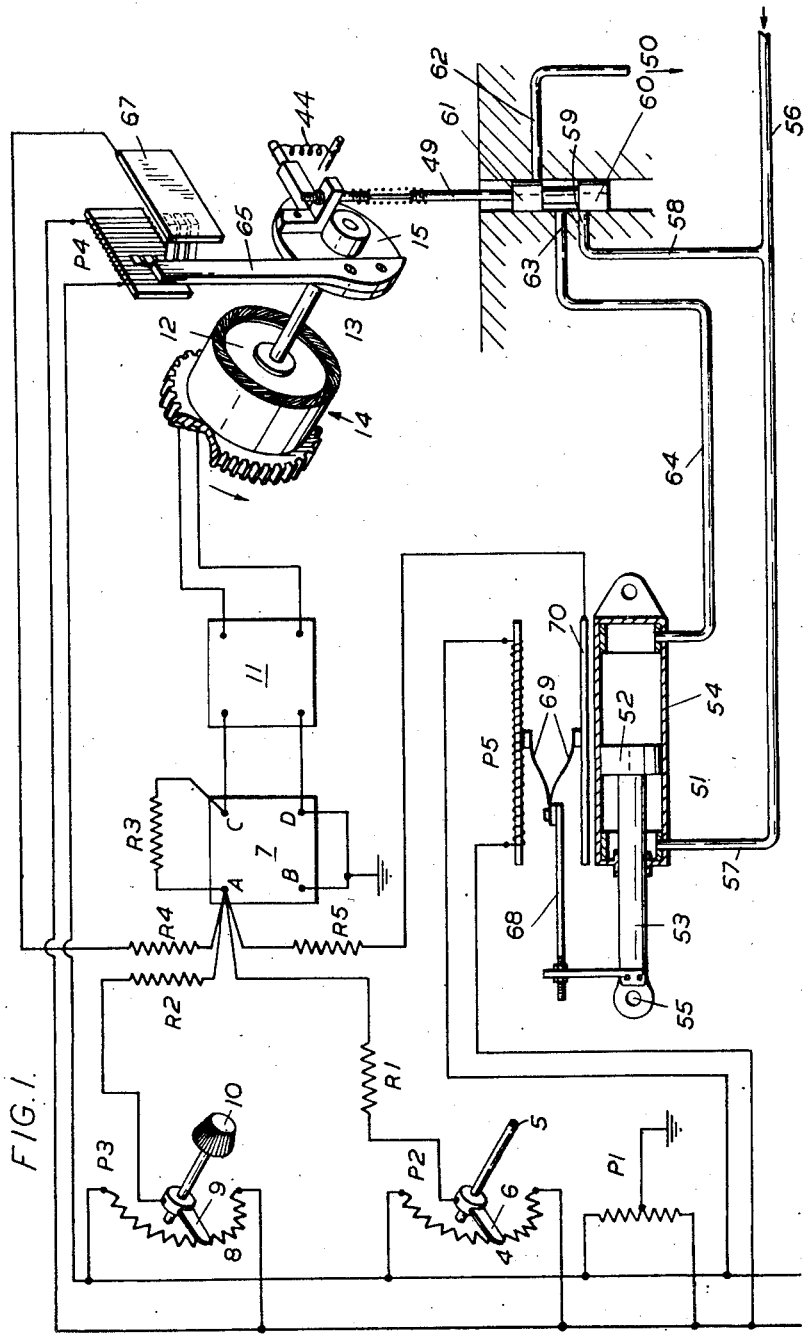

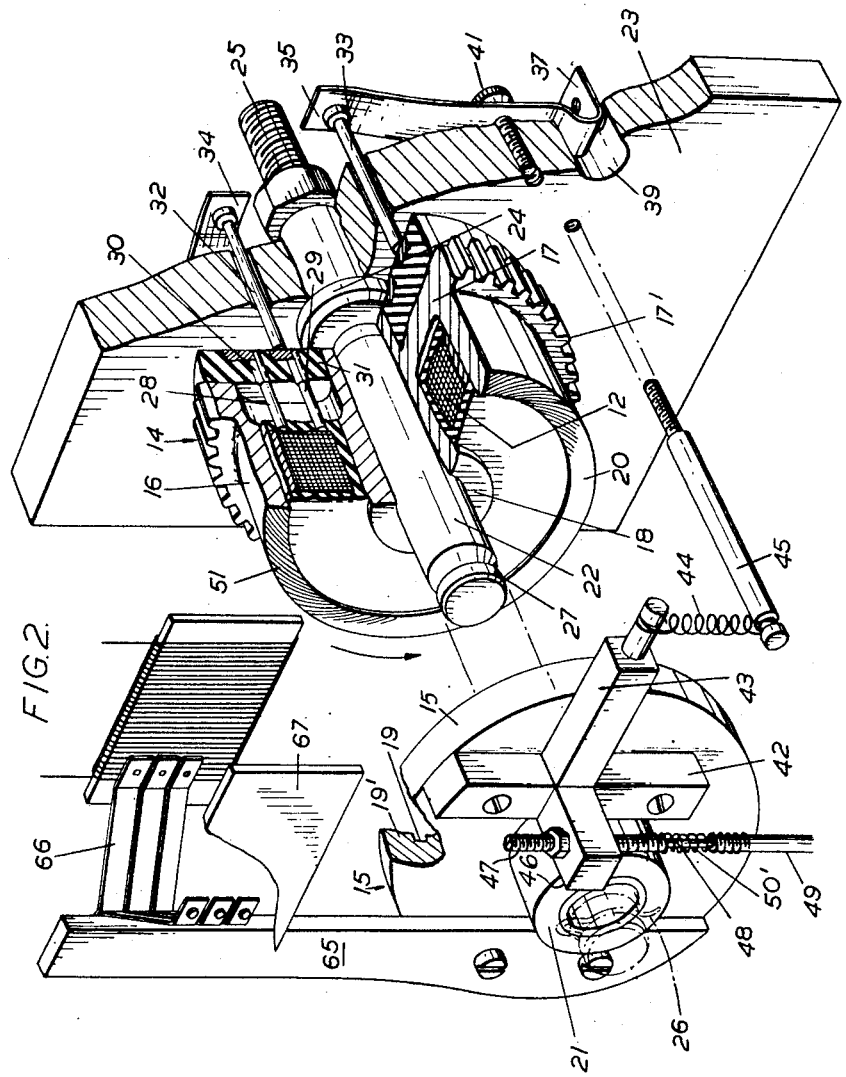

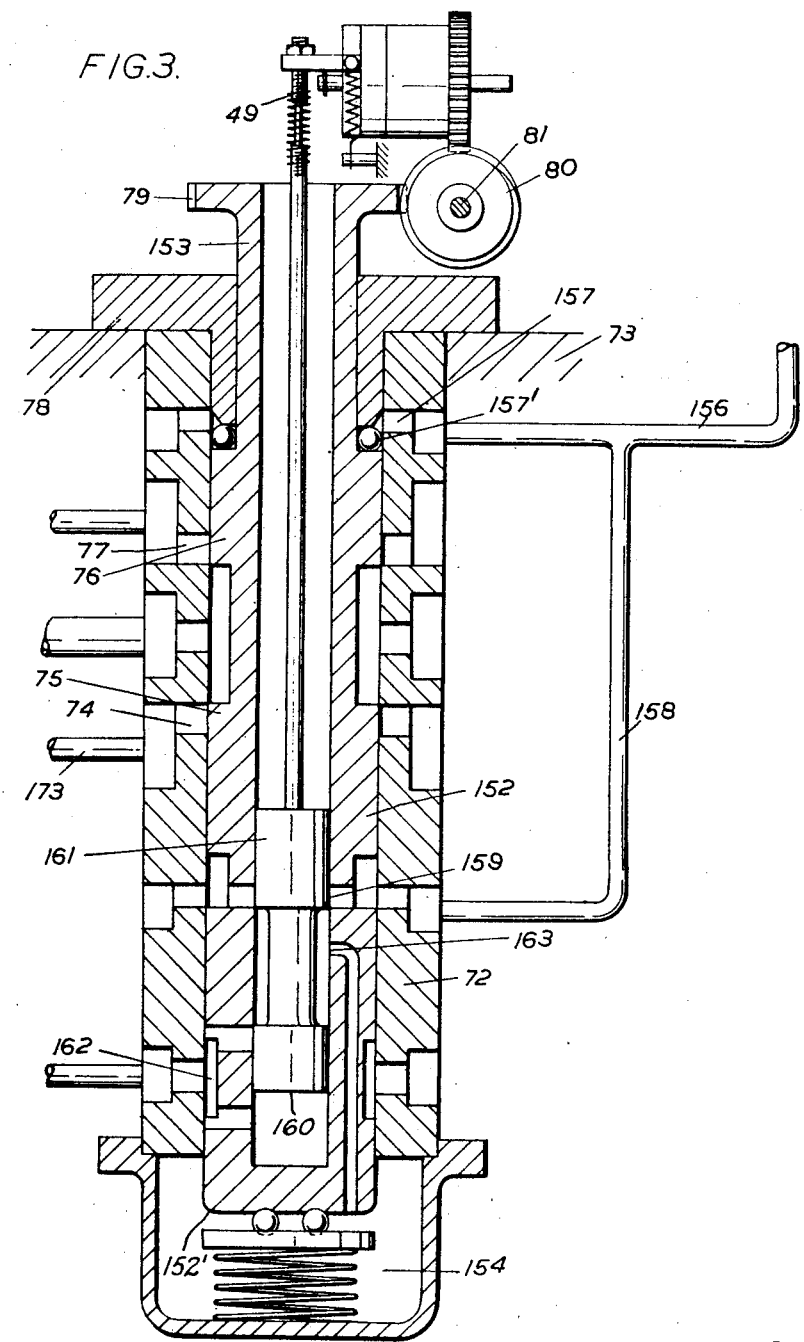

Patented July 7, 1953

2,644,427

UNITED STATES PATENT OFFICE 2,644,427

SERVO SYSTEM

Hugh Brougham Sedgfield, London, Frederick Arthur Summerlin, Lee, London, and George Hambly Kyte, Ealing, London, England, assignors to The Sperry Corporation, a corporation of Delaware Application July 15, 1949, Serial No. 104,862
In Great Britain July 16, 1948

8 Claims. (Cl. 121—41)

This invention relates to servo systems for the automatic regulation of the value of a variable, and is concerned particularly with the selection of a novel combination of power amplifier or relay devices having considerable advantage as a combination in a servo system. One of these relay devices is an electro-magnetically controlled friction clutch. The invention relates to an improved electromagnetically controlled friction clutch having advantages over prior electromagnetic clutches for use in servo-systems, and particularly for use in the servo system of the invention, and to servo systems employing such friction clutches.

The theoretical investigation and design of servo systems has made very considerable progress in the last 15 years, with the result that servo systems may be designed to have very high performance. The limit now attainable is determined mainly by the type of power motor used as the main servomotor of the system and the kinds of power relay used to control it. Generally speaking, all these have characteristic time constants, with the result that the system cannot operate to follow or correct oscillatory changes or errors having a recurrence period shorter than the total time lag of the system, which is made up of the time constants of the survomotor and of the power relays controlling it. When it is desired to obtain close accuracy of control, as in automatic pilots for aircraft that may have to control the aircraft to follow a radio-defined landing path with close accuracy, the problem involves that of designing a servo system in which the overall time lags are kept as small as possible. In systems using electrical servomotors, time lags can be cut down to a limited extent by good design, but after that further improvement involves increasing the ratio of resistance to inductance in the control circuits, which necessitates low efficiency and increased bulk and weight of the equipment. On the other hand, in the systems that have been proposed hitherto in which hydraulic servomotors have been used, time delays in operating the control valve have been a serious factor limiting the possibility of obtaining high performance.

Therefore, the primary object of the present invention is to provide a servo system comprising the combination of main servomotor and of relays controlling the latter in response to an error signal, characterised by a very small overall time lag.

More specifically, there is provided according to the present invention a servo-system for the automatic control of a variable, comprising electrical means for providing an electrical control on error signal measuring the departure of the variable from a set datum value, and an electromagnetic friction clutch arranged to have its input member continuously driven, and to have engagement between its input and output members controlled, at least in part, from the electrical control signal, a valve whose position or displacement is controlled by the output member of the clutch, and a fluid-actuated servomotor controlled directly or indirectly by the valve for exerting a control action or force serving to restore the value of the variable towards the datum value. In a system according to the invention where the servo-motor is, for example, a hydraulic servomotor employing high-pressure fluid, the valve that is operated by the clutch may control the servo-motor indirectly. For this purpose it may be designed as a pilot valve whose displacement controls a follow-up member, which may be a sleeve surrounding the pilot valve, and which acts as the final or direct control valve for the servomotor by covering and uncovering the ports that supply fluid to or from the servo-motor.

The invention is particularly applicable to the automatic flight-controlling systems of aircraft, usually referred to as automatic pilots, in which a servo-motor actuates a control surface of the aircraft to operate it in such a manner as to maintain constant some condition of flight of the aircraft, such as its course or attitude, that constitutes the variable that is to be maintained at a predetermined set datum value.

The difficulties that arise in obtaining smooth and fast operation of an electromagnetic clutch arise out of the difference between the magnitudes of static and dynamic friction. When the two friction faces of a clutch, one continuously rotating and the other not, are first brought into engagement, there is at first relative slip between them, so that dynamic friction is in operation. If pressure between the friction faces is increased, the relative slip decreases, and, if the two faces become fully engaged so as to turn together without relative slip, static friction comes into operation. The zone of operation is therefore that in which, during engagement of the two faces with each other, the friction is changing from dynamic to static conditions while the slip velocity is changing from a finite value to zero, and in which, during disengagement, the reverse change takes place. However, since dynamic friction is less than static friction, it follows that the curve displaying frictional torque as a function of slip velocity, for any one pressure between the friction faces, must have a falling characteristic in this transition zone. A falling characteristic, however, is precisely the condition that causes instability of operation. For many purposes for which a clutch may be used, such as those in which the clutch is operated at relatively infrequent intervals for engaging a source of power to drive a load, such instability is relatively unimportant, as all that is required from the clutch is that it should change from disengagement to full engagement, that is, from full slip to zero slip, and the phenomena in the transition period do not greatly matter, provided that there is no violent shuddering. In particular, it does not matter in such systems whether the final transition to zero slip takes place on every operation at the same value of the energising current or even at the same value of the pressure between the contact faces. However, for some purposes, and particularly for those in which a clutch is to be used as part of a fast-acting servo-system, the phenomena in the transition zone are of great importance. Thus, in a fast-acting servo-system the clutch is operating in the transition zone for practically the whole period of its use. In particular, as is explained in more detail hereinafter, the clutch of the present invention is arranged to have its friction faces permanently in frictional contact, and control is exerted merely by varying the pressure between the faces, so as to vary the frictional torque transmitted by the clutch. The clutch is therefore always operating in the transition zone referred to. It is therefore extremely important, for accurate operation of the servo system as a whole, that the clutch should be capable of being controlled smoothly in the transition zone, so that the torque transmitted increases progressively with the energising current, without snatching, oscillation, or other irregularity.

A still further object of the present invention resides in the provision of an electromagnetically operated clutch, the contacting faces of which are in continuous frictional engagement and the torque output of the clutch is controlled by varying the pressure between the frictionally engaged faces, whereby the torque transmitted thereby is increased or decreased progressively with a control signal without jumping, oscillating, or slipping.

It has been found by prolonged tests that, in friction clutches of the dry-plate type, even in those in which the faces are of materials not liable to local seizing or welding of the surfaces and subsequent tearing of one surface by the other, not only is there a liability to snatching and oscillation, due to the fact that the operation is in the transition zone between static and dynamic friction, but also there is a further type of irregularity of operation, due apparently to the fact that friction tends to clean the friction surfaces in localized areas for short intervals of time to a state of chemical cleanness. Thereupon, if the surfaces cease to slip so that static friction comes into play, the static frictional torque transmitted may jump to an abnormal value many times higher than normal owing to the increased abnormal static friction coefficient that obtains between surface areas that are chemically clean.

An obvious way of preventing this last-mentioned effect from occurring is to employ a lubricant, such as an oil, or grease, film between the friction faces. Unfortunately (from this point of view) a film of lubricant has the property of making the dynamic friction very much less than the static friction and therefore of greatly increasing the negative slope of the torque-versus-slip characteristic in the transition zone referred to. In fact, it has been found by further prolonged tests that, if lubricated-free clutches, of any design hitherto known, are used, oscillations of the output member are liable to be set up even more readily than in dry-plate clutches, (though of a different character, being more regular and smoother). These oscillations render such clutches too unstable for them to be used in a servo system intended to have the fast-acting properties desired.

A novel lubricated clutch free from these defects has, however, been devised, based on the discovery that, if the contacting faces of a lubricated clutch are broken up into very small areas by grooves lying between adjacent areas, the frictional torque between the faces does not fall to the low value characteristic of a complete film of lubricant lying between the friction faces and providing dynamic lubrication.

The physical reason underlying this penomenon is not known. It may be that the lubricant is somehow prevented from forming a complete film between each of the individual small areas on one face and the area opposite to it, capable of supporting the pressure between the faces, or it may be that, when the two faces are slipping relatively to each other, the lubricant that moves out from between two mutually contacting areas into a groove between two adjacent areas sets up a turbulent motion in the groove, and that this turbulence introduces a frictional drag torque between the two members of the clutch greater than the slip obtaining when a complete oil film lies between two complete contact faces.

According to the second feature of the invention, therefore, there is provided an improved electromagnetic clutch specially suitable for use in servo systems, and particularly in the servo system of the invention, of the kind in which an input member and an output member are both mounted for rotation about a common axis, and are provided with electromagnetic means for urging one member towards the other along the said axis, wherein the two members are arranged to make contact, when so urged together, over annular friction faces, each formed of hard wear-resisting material, and at least one being rendered rough or serrated in such a way that the frictional torque obtained between the faces when these are lubricated, for a given pressure and slip velocity between the faces, is high compared with that which would be obtained between smooth lubricated faces under the same conditions. Preferably both friction faces are serrated in this manner and preferably the serrations are in the form of closely spaced grooves that break the contact area on each member into a set of narrow ridges, the grooves and ridges in one face being inclined at an angle to those on the other face.

Therefore, according to a still further object of the invention, there is provided an electromagnetic clutch which comprises an input member and an output member having electromagnetic means for urging one member into continuous frictional contact with the other and in which at least one of the engaged members is serrated or roughened for increasing the transfer of torque therebetween when a lubricating material is provided between the surfaces.

A further object resides in the provision of a clutch of the above character in which the serrations are in the form of number narrow ridges on each member, the grooves or ridges on one member being angularly disposed relative to the grooves or ridges on the other member.

The above-mentioned and other features of the invention and the above-mentioned and other advantages provided by it will become clear from the description given below, with reference to the accompanying drawings, of a particular servo system according to the invention employing a particular design of clutch according to the invention.

Fig. 1 of the drawings is a diagrammatic layout of a complete servo-system according to the invention as applied in the automatic control of an aircraft in pitch by actuation of the elevator;

Fig. 2 shows on an enlarged scale a detailed perspective view (partly exploded) of a friction clutch according to the invention that is used in the system of Fig. 1; and Fig. 3 shows details of a modified form of control valve, which includes a follow-up relay valve, suitable for use instead of the valve shown in Fig. 1 specially adapted for use when the hydraulic servo motor is one employing high-pressure fluid.

In Fig. 1 a fixed potential divider $P_1$ is connected across the main direct-current supply lines 2, 3 and has its centre point connected to the earth point of the system.

A variable potential divider $P_2$ has a winding 4 concentric with the axis of a shaft 5, to which a brush or slider 6 making contact with the winding is connected, so that, on relative angular motion of the shaft 5 and the winding 4, the brush 6 moves over the winding and picks off a variable potential, which applies current through a resistor $R_1$ to input terminal A of a direct-current amplifier 7. The other input terminal B of the amplifier is connected to earth. Thus $P_2$ applies to the amplifier a D.-C. potential that is positive or negative according as the brush 6 rests on the winding 4 to one side or other of its electrical centre.

The shaft 5 is mechanically coupled to a gyro-vertical (not shown) so that, when the aircraft on which the apparatus is carried pitches, the winding 4, which is fixed relative to the aircraft, turns about the shaft 5, and a variable voltage or current input, measuring, in magnitude and sign, departure of the aircraft from a predetermined pitch-angle datum, is applied to the amplifier.

A third potential divider $P_3$ has its winding 8 also connected across the supply lines 2, 3; its contact brush 9 is angularly adjustable over the winding under the control of control knob 10, and is electrically connected through resistor $R_2$ to input terminal A of amplifier 7. By turning knob 10 the potential of 9 may be varied. This causes a change in the current supplied through $R_2$, thus varying the input to amplifier 7.

As will be seen herein after, the control system operates to turn the aircraft about its pitch axis towards an angular position in which the total current supplied to the input terminal A of amplifier 7 by potential dividers $P_2$ and $P_3$ through resistors $R_1$ and $R_2$ is zero. This angular position is the datum position, departures from which are automatically corrected by the control system. It follows that a change in the setting of manual control knob 10 brings about, through the control system, a change in the datum position of the craft, the change being such that in consequence of it divider $P_2$ provides a change in the current through $R_1$ substantially equal and opposite to that produced through $R_2$ by the change in setting of potential divider $P_3$. Potential divider $P_3$ thus sets the datum pitch angle of the system.

Degenerative coupling, or negative feed-back, is provided between the output of amplifier 7 and its input by interconnection of output terminal D and the earthy input terminal B and by connection of output terminal C to input terminal A through a high resistance $R_3$. This has the property of maintaining the point A at a potential very near earth potential so that the amplifier presents a very low impedance to the input circuits connected to it. As a result the current A supplied by any one potential divider circuit such as $P_2$ is substantially independent of adjustments made on other potential dividers such as $P_3$, $P_4$, $P_5$.

Amplifier 7 is a high-gain amplifier stabilised against drift.

The output of amplifier 7 obtained from terminals CD is applied to a further amplifier 11 whose output is in turn applied to energise the winding 12 of the electromagnetic clutch 13.

As is shown in more detail in Fig. 2 the clutch consists of two main members—an input or driving member 14, and an output or driven member 15. The input member 14 is generally cup-shaped; it has a cylindrical outer wall 16 extending from a base 17 integral with it and a central hollow pillar or tube 18 also integral with the base 17 and extending coaxially in the interior of the outer cylindrical wall. The base 17 has a toothed flange 17' by which it is continuously rotated when the clutch is in operation. The electrical winding 12 is disposed in the annular space between the outer cylindrical wall 16 and the central pillar 18. The output or driven member 15 has the general form of a disc having one face—the face that faces the cup-shaped driving member 14—plane, except for an annular recess 19 just inside the rim 19', which has substantially the same dimensions as the end surface 20 of the outer wall 16 of the input member 14, so that the surface of the rim 19' of the driven member 15 and the end surface 20 of the outer wall of the driving member 14 come into contact when the two members of the clutch are brought together. They constitute the friction surfaces by which the driving member drives the driven member of the clutch. The output member 15 has a central boss 21 on the side of the disc remote from the input member; a hole is bored through it and through the disc itself along the axis of the disc.

The driving and driven members of the clutch are both made of a material having a high permeability, such as that sold under the British trade name Mumetal or that sold under the British trade name Radio metal. The two members are mounted on a fixed post 22 rigidly mounted in a panel 23 by means of a flange 24 on the post 21, which abuts against the front face of the panel, and of a clamping nut 25 screwed on the end of the post on the side of the panel remote from the clutch. The holes in central pillar 18 and boss 21 are running fits on the post. The output member of the clutch 15 is held in contact with the cup-shaped inner member 14 by means of a spring clip 26 which is engaged in a groove 27 in post 22.

Electrical connections are made to the ends of the winding 12 by means of insulated pins 28, 29, which pass through the base 16 of the member 14 into concentric slip rings 30, 31 mounted in, and insulated from, the outer surface of the base. Connections are made to the slip rings by contact pins 32, 33 which are slidably mounted in holes in the panel, and which are urged into contact with the slip rings by spring pressure applied by the contact blade springs 34, 35 respectively. These springs are each located in position by engagement of a fold 37 (in the case of blade spring 35) in a hole or recess 39 in the panel 23 and by a clamping screw 41 screwed into the panel. Connections from the amplifier 11 are made to the ends of the blade springs.

It will be apparent that current flowing in the winding 12 will cause magnetic flux to pass in a circuit along the central pillar 17 in member 15, thence across a small air gap into the centre of disc member 15, thence radially outwards to the rim 19', thence through the rhodium plating (which constitutes effectively an air gap in the magnetic circuit), and back along the outer wall 16 and base 17 of member 14.

During manufacture, the end surface of member 14 is ground flat, so that the end surface of pillar 18 is coplanar with the end surface of the outer wall 16, and, similarly, the inner face of the disc-shaped member 15 is ground flat. The intended contact areas or friction faces—the annular end surface of the outer wall 16 of member 14 and the corresponding annular area 19' on disc 15—are then electroplated with rhodium to form hard wearing friction surfaces, but, before being electroplated, are first machined to cut grooves 51 in them. In the clutch illustrated the outer wall 16 of member 14 is approximately one inch in external diameter and is $\frac{1}{16}$ of an inch thick; in this clutch the grooves are cut in the end surface of the wall 16 every 2° round the circumference. Each groove is cut obliquely to the radius to it, all at the same angle, and they are of such a width as to occupy in total one half of the surface area of the end surface of the wall 16. In other words the contact area is reduced by 50% owing to the presence of the grooves 51. The rim 19' of member 15 is similarly cut into small areas by grooves that are cut obliquely to the radii to them in such a way that, when member 15 makes contact with member 14, the grooves in one member are oblique to those in the other. Before plating, the grooved surfaces are bored to remove burrs and smooth the plates between the grooves.

In consequence of the plating of the grooved rim 19' of member 15 the surface of the rim is raised relatively to the remainder of the disc, and as a consequence of the plating of the grooved end surface 20 of the wall 16 this surface is raised relatively to the central pillar 18. Consequently when members 14, 15 are in contact, the contact areas are solely those lying between the grooves on the end of wall 16 of member 14 and those lying between the grooves on the rim of member 15, an air-gap being formed at the end of pillar 18. Furthermore the plating being non-magnetic, is itself equivalent to an air-gap between the wall 16 of member 14 and the rim 19' of member 15. The lengths of these air-gaps measured in the direction of the flux are both equal to the sum of the thicknesses of the electroplatings on the two members. The thickness of the rhodium plating may be .0005"; it has been found preferable first to plate the metal with about .00015" of copper or nickel.

In operation, the member 14 is continuously driven from a constantly running motor; the member 15 is always pulled against the member 14 by flux that is caused to circulate in the flux circuit already described under the influence of the current in the exciting winding 12.

The amplifier 11 passes current to the winding 12 even when there is no signal input to the amplifier 7, so that the member 15 of the clutch is always pulled against the member 14. The application of a positive or a negative signal input to the amplifier 7 results in an increase or decrease of current in the winding 12 and therefore in an increase or decrease in the force with which the member 15 is pulled against the member 14. With divider $B_2$ representing the means providing the variable control signal, the electromagnetic circuit of the clutch provides a means that functions to quantitatively vary or modify the frictional engagement of the clutch members of the system in accordance with or in proportion to the control signal from the variable signal means.

Secured to the member 15 is a block 42, having an arm 43 to the end of which a tension spring 44 is connected. The other end of the spring is connected to a pillar 45 fixed into the panel 23. The member 14 is driven in the direction shown by the arrow, so that the member 15 tends to rotate in the same direction, and therefore to extend the spring 44. The steady current in winding 12 and the consequent steady electromagnetic pull from member 15 against member 14, therefore results in the application to member 15 of a steady driving torque which rotates this member until the tension of spring 44 prevents further rotational displacement. If the clutch is smooth in its operation and free from oscillation, the normal state of the clutch, in the system described, is therefore that in which the output member 15 is rotationally displaced through a constant angle against the tension of spring 44. The effect of positive or negative inputs into the amplifier 7 is to increase or decrease the electromagnetic pull between members 15 and 14, and therefore the driving torque transmitted by member 14 to member 15. On an increase in the transmitted torque, the member 15 is rotationally displaced through a larger angle, increasing the tension in spring 44; decrease in the transmitted torque enables the tension in spring 44 to pull the member 15 backwards against the transmitted torque. Thus the member 15 undergoes angular positive or negative displacement in a sense or direction corresponding with positive or negative signal inputs to amplifier 11. Accordingly, the spring 44 functions as a means for providing a biasing torque on the clutch output member 15 or servo control means that is equal and opposite to the torque imparted thereto by the clutch input member 16.

The block is also provided with an arm 46 into which is screwed a pin 47 extending downwards as shown in Fig. 2. A conical recess is formed in the lower end of this pin. A long distance pin, or thrust rod 48, having conical ends engages at one end into this conical recess, and engages at the other end into a corresponding conical recess in the end of valve rod 49 of hydraulic valve 50. The upper end of valve rod 49 is threaded, and is screwed into the end of a tension spring 50', which at its upper end is screwed on the screw 47. The coupling link formed by thrust rod 48 and tension spring 50 converts angular movement of the output member 15 of the clutch round the axis of the clutch in either direction into corresponding linear movement of valve rod 49 in one direction or the other.

The valve 50 controls the flow of pressure fluid into a servomotor 51. As shown, the servomotor is of the two-to-one type; that is to say, the piston 52 of the servomotor is carried on the end of a piston rod 53 which protrudes through a gland in one end of a cylinder 54 and is coupled at the end 55 to the load that the servomotor is to actuate, the area of cross section of the piston rod being one half the area of the face of the piston. Fluid under pressure is supplied from a source not shown through pipe 56, and thence through pipe 57, to the left-hand end of the cylinder 54, which is the end containing the piston rod 53. The pressure fluid is also supplied through pipe 58 to the inlet port 59 of the cylinder of valve 50. In its normal or zero position this port is just closed by a land 60 carried on the valve rod 49; a second outlet port is just covered by a land 61 while a third port 63 opening into the cylinder wall between lands 60 and 61, is connected by pipe 64 to the right-hand end of the servo-motor cylinder 54.

In operation, when the piston rod 49 is displaced downwards, and 60 uncovers port 59, so that pressure fluid is admitted through pipes 58 and 64 to the right-hand end of the servo-motor cylinder 54, where, by reason of the fact that the area exposed to pressure fluid is great on the right-hand side, piston 52 is displaced to the left. If, on the other hand, the valve rod 49 is displaced upwards, port 59 is closed by land 60 and port 62 is uncovered; the right-hand end of the servo-motor cylinder 54 is then connected through pipe 64 and ports 63 and 62 to exhaust, with the result that the pressure fluid supplied through pipe 57 to the left-hand end of the servomotor becomes effective to displace the piston 52 to the right.

Thus the direction of motion of the servo-motor piston 52, and therefore of the load actuated by it, is controlled by the displacement of the valve rod 49, and therefore by the sense of the input signal to the amplifier 7.

In the system illustrated the servomotor piston is connected to actuate the elevator of the aircraft (which is not illustrated in the drawings) the direction of actuation being such that, if the aircraft turns about its pitch from the set pitch datum, so that a signal input is applied by potential divider $P_2$ to the amplifier 7, the elevator is actuated in the direction that checks the deviation in pitch, and to return the aircraft towards the pitch datum angle.

In order to prevent over-control, measures are taken to limit the displacement of valve rod 49 in response to a signal input to amplifier 7, and also to limit the displacement imparted to the elevator by the servo-motor piston 52.

For this purpose there is fixed to the output member 15 of the clutch an insulated arm 65 at the end of which a number of contact springs or brushes 66 are mounted at their centres. One set of ends rests, exerting contact pressure, on the resistance winding of potential divider $P_4$, while the other ends rest, exerting contact pressure, on a contact plate 67. The two ends of the potential divider $P_4$ are connected to the D.-C. supply lines 2 and 3, while the contact plate 67 is connected to terminal A of amplifier 7 through resistance $R_4$.

The arrangement is such that angular movement of the output member 15 of the clutch causes the contact brushes 66 to move over the winding of the potential divider $P_4$ so as to make contact with points of different potentials on it. The arms are of resistive material, and the points on which they rest on the winding are slightly staggered, so that the potential picked off by contact plate 67 is a mean of the potentials at the points at which the contact brushes 66 make contact with the winding. In this way, the potential variations experienced by plate 67 as the brushes move from turn to turn of the winding of the potential divider are much smaller than if a single-contact brush were used. The apparatus is so set up that, in the normal position of the output member 15 of the clutch—the position to which it is displaced against the tension of spring 44 when the standing value of output current from amplifier 11 is flowing in the clutch winding 12 (corresponding to zero input to amplifier 7)—the brushes 66 are in the centre of the winding of the potential divider $P_4$, so that the contact plate 67 is at earth potential, and no current input is applied from this plate through resistance $R_4$ to terminal A of the amplifier. Thereafter, if a signal input is applied to the amplifier, say, from potential divider $P_2$ on the occurrence of a pitch of the aircraft, the consequent change of energisation of the clutch results in turning of the output member 15 of the clutch. The consequent change in the voltage picked off the potential divider $P_4$ by the contact brushes 66 and contact plate 67 is of the opposite sense to the original signal input, and neutralises the latter when the valve 49 has moved through a distance proportional to the signal input.

In response to a displacement of the valve rod 49, the servo-motor piston 52 starts to move. Connected to the piston rod 53 is an arm 68 carrying a set of multiple-contact contact brushes, the ends of which rest on the winding of potential divider $P_5$, which is similar to $P_4$, while the other ends rest on a contact plate 70 in the same manner as is shown in connection with potential divider $P_4$. The ends of the winding of the potential divider $P_5$ are connected to the D.-C. supply lines 2 and 3, while the contact plate 70 is connected through a resistance $R_5$ to terminal A of amplifier 7. In this way, the motion of the servo-motor in response to an input signal to the amplifier 7 is limited by negative feed-back from the contact plate 70.

Fig. 3 shows a modified form of valve by means of which movement of the valve rod 49 may be used to control a hydraulic servomotor employing high-pressure fluid, e. g. pressures of the order of 1,000 lbs. per sq. inch. The valve of Fig. 3 includes a pilot valve and comprises a valve rod 49 and two lands 160 and 161. This pilot valve controls ports numbered in the same manner as in Fig. 1, but prefixed with the number 1, so that the reference numerals are higher by 100 than the corresponding reference numerals in Fig. 1. The ports 159, 162, controlled by the pilot valve are, however, located in the interior surface of a follow-up sleeve 152, arranged for axial movement in a liner 72 in the cylinder block 73. Movement of the pilot valve relatively to the follow-up cylinder controls the flow not of the main high-pressure fluid but of fluid at a reduced pressure. The control is effected in the same way as in Fig. 2, but the output pressure fluid so controlled is applied to effect movement of the follow-up sleeve 152 itself, instead of movement of the servo-motor piston 52. For this purpose the follow-up sleeve 152 is itself designed as a two-to-one servo unit, the area of the piston face 152' presented by the follow-up sleeve to pressure fluid in the end space 154 being double that presented to pressure fluid applied through the port 157 to act on the sleeve in the opposite direction. It follows that whenever the pilot valve is displaced upwards or downwards, pressure fluid at the reduced pressure operates to move the follow-up sleeve in the same sense to follow the pilot valve thereby cutting off the supply of pressure fluid again when the follow-up sleeve has caught up with the pilot valve.

Movement of the follow-up sleeve 152 relative to the liner 72 controls the application of high-pressure fluid to the servo-motor. The high-pressure fluid enters through pipe 173 and port 74. This port is normally covered by land 75 on the sleeve, but displacement of the follow-up sleeve downwards results in uncovering this port and allowing the high-pressure fluid to flow into the space between lands 75 and 76 and thence to the servo-motor. Land 76 normally covers port 77 in the liner leading to the exhaust pipe, so that movement of the follow-up sleeve upwards connects the controlled side of the servo-motor to exhaust.

Put briefly, therefore, the pilot valve controls movement of the follow-up sleeve in the same manner as the control valve of Fig. 1 controls the main servo-motor, while movement of the follow-up sleeve controls movement of the main servo-motor, again in the same manner, but using high-pressure fluid.

As shown in Fig. 3, the follow-up sleeve 152 has an extension 153 having half the cross-sectional area of the lands which pass is in a substantially oil-tight manner through an end seal 78 for the cylinder and carries at its end a straight-toothed worm wheel 79. This wheel engages with a worm 80 on a shaft 81 that is continuously driven from a motor (not shown). In this way the follow-up sleeve is continuously rotated while being controlled for longitudinal motion, thereby reducing friction and sticking opposing longitudinal movement of the pilot valve. The worm 80 also engages with the toothed flange of the input member 14 of the clutch 13, and is the means for continuously driving this member. It is to be understood that the longitudinal movement of the pilot valve and therefore of the follow-up sleeve is quite small, so the worm wheel 79 remains always in engagement with worm 80.

In automatic pilots for aircraft it is necessary to have servo-motors for controlling at least two, and more usually three, control surfaces, the rudder, the elevator, and the ailerons, each servo-motor and the control surface that it operates forming part of a servo system for controlling the aircraft about one of its principal axes. The construction above described is readily adapted for the operation of a plurality of servo systems. For this purpose three control valves and three friction clutches connected to actuate three control valves may set up as a single unit, all driven from a single motor (which may be a constantly running hydraulic motor) arranged to turn a single shaft 81 on which three worms such as 80 may be disposed spaced along its length. Each worm can then serve to drive the input member of one of the friction clutches and also to drive a worm wheel such as 79 for rotating the follow-up sleeve of the corresponding control valve.

It will be appreciated that the foregoing description of one particular embodiment of the invention has been given by way of example only and that many modifications may be made without departing from the scope of the invention.

We claim:
1. A servo system comprising a servo-motor, control means for controlling the magnitude and direction of operation of said servo-motor, means providing a variable control signal, a clutch having an input member and an output member, said input member being continuously driven in one direction at a substantially constant speed and said output member being maintained in continuous frictional engagement with said input member whereby said output member tends to be torqued in the direction of movement of the input member, means connected with said output member for producing a torque thereon equal and opposite to the torque imparted thereto by said input member, and means responsive to the signal of said variable control signal means for quantitatively modifying the frictional engagement between said clutch members whereby said servo-motor control means is actuated in one direction by increasing the frictional engagement between the clutch members and in the other direction by decreasing the frictional engagement therebetween.

2. A servo system comprising a servo-motor, control means for controlling the magnitude and direction of operation of said servo-motor, means providing a variable control signal, a clutch having an input member and an output member, said input member being continuously driven in one direction at a substantially constant speed and said output member being maintained in continuous frictional engagement with said input member whereby said output member tends to be torqued in the direction of movement of the input member, a spring connected with said output member for producing a torque thereon equal and opposite to the torque imparted thereto by said input member, and means responsive to the signal of said variable control signal means for quantitatively modifying the frictional engagement between said clutch members whereby upon an increase of the frictional engagement between said members said servo-motor control means is actuated in one direction by a torque imparted thereto by the motion of said input member, and upon a decrease in the frictional engagement between said clutch members said servo-motor control means is actuated in the opposite direction by a torque imparted thereto by movement of said output member through said spring.

3. A servo system as set forth in claim 2 further comprising means coupled with said output clutch member for producing a signal proportional to the displacement thereof, and means for modifying the signal of said variable control signal means by said displacement signal.

4. In a servo system as set forth in claim 2 further comprising means coupled with said output clutch member for producing a signal proportional to the displacement thereof from a predetermined position, means for producing a signal proportional to the displacement of said servo-motor from a predetermined position, and means for modifying the signal of said variable control signal means in accordance with said two displacement signals.

5. The combination in a servo system of, a servo-motor, control means for controlling the magnitude and direction of operation of said servo-motor, means providing a variable control signal, clutch means having a continuously driven input member and an output member in continuous predetermined frictional engagement with said input member connected to said servo-motor control means, means for providing a biasing torque on said output member equal and opposite to the torque imparted thereto by said clutch input member, and means responsive to the signal of said variable control signal means for modifying the frictional engagement between said clutch members, said torque biased servo-motor control means being actuated in one direction with an increase in the frictional engagement between the clutch members over the predetermined amount and in the other direction with a decrease in the frictional engagement between the clutch members under the predetermined amount.

6. The combination in a servo system of, a servo-motor, control means for controlling the magnitude and direction of operation of said servo-motor, means for biasing said servo-motor control means, means providing a variable control signal, clutch means having a continuously driven input member and an output member in continuous predetermined frictional engagement with said input member connected to said servo-motor control means to produce a torque thereon equal and opposite to the torque imparted thereto by said biasing means, and means responsive to the signal of said variable control signal means for modifying the frictional engagement between said clutch members, the biased servo-motor control means being operated in one sense with an increase in the frictional engagement between the clutch members over the predetermined amount and in the other sense with a decrease in the frictional engagement between the clutch members under the predetermined amount.

7. The combination in a servo system of, a fluid operated servo-motor, a control valve for controlling the magnitude and direction of operation of said servo-motor, electrical means providing a variable control signal, an electromagnetic clutch having a continuously driven input member and an output member connected to said control valve, means for energizing said electromagnetic clutch so that said members are continuously engaged and provide a predetermined torque transfer therebetween, means for providing a biasing torque on said output member equal and opposite to the torque exerted thereon by said clutch, and means for varying the energization of said electromagnetic clutch in accordance with the signal of said variable control signal means to increase or decrease the torque transfer between the clutch members and thus effect operation of said control valve.

8. In a system of the class described, the combination of, means providing a variable control signal, clutch means having a continuously driven input member and an output member in continuous predetermined frictional engagement with said input member, means for providing a biasing torque on said output member equal and opposite to the torque imparted thereto by said clutch input member due to the predetermined frictional engagement, means responsive to the signal of said variable control signal means for modifying the frictional engagement between said clutch members, and control means operatively connected to said torque biased output member operated in one sense when the frictional engagement between the clutch members is increased over the predetermined amount and in the other sense when the frictional engagement is decreased under the predetermined amount.

HUGH BROUGHAM SEDGFIELD.
FREDERICK ARTHUR SUMMERLIN.
GEORGE HAMBLY KYTE.

References Cited in the file of this patent

UNITED STATES PATENTS

| Number | Name | Date |
|---|---|---|
| 1,245,823 | Tompkins | Nov. 6, 1917 |
| 2,248,495 | Dupy | July 8, 1941 |
| 2,254,625 | Ryba | Sept. 2, 1941 |
| 2,262,173 | Fischer | Nov. 11, 1941 |
| 2,315,298 | Thompson | Mar. 30, 1943 |
| 2,423,935 | Hart | July 15, 1947 |